(12) United States Patent
Fox

(10) Patent No.: US 9,135,263 B2
(45) Date of Patent: Sep. 15, 2015

(54) METHOD AND SYSTEM THAT ROUTES REQUESTS FOR ELECTRONIC FILES

(71) Applicant: Sonatype, Inc., Silver Spring, MD (US)

(72) Inventor: Brian Edward Fox, Goffstown, NH (US)

(73) Assignee: Sonatype, Inc., Fulton, MD (US)

( * ) Notice: Subject to any disclaimer, the term of this patent is extended or adjusted under 35 U.S.C. 154(b) by 306 days.

(21) Appl. No.: 13/744,542

(22) Filed: Jan. 18, 2013

(65) Prior Publication Data

US 2014/0207753 A1    Jul. 24, 2014

(51) Int. Cl.
*G06F 17/30* (2006.01)

(52) U.S. Cl.
CPC ................ *G06F 17/30115* (2013.01)

(58) Field of Classification Search
None
See application file for complete search history.

(56) References Cited

U.S. PATENT DOCUMENTS

| | | | |
|---|---|---|---|
| 5,615,400 A | 3/1997 | Cowsar et al. |
| 6,167,535 A | 12/2000 | Foote et al. |
| 6,282,698 B1 | 8/2001 | Baker et al. |
| 6,931,544 B1 | 8/2005 | Kienhofer et al. |
| 7,080,355 B2 | 7/2006 | Carlson et al. |
| 7,149,734 B2 | 12/2006 | Carlson et al. |
| 7,159,206 B1 | 1/2007 | Sadhu et al. |
| 7,234,131 B1 | 6/2007 | Speyrer et al. |
| 7,322,024 B2 | 1/2008 | Carlson et al. |
| 7,340,719 B1 | 3/2008 | Bakerman et al. |
| 7,343,386 B2 | 3/2008 | Gomes et al. |
| 7,506,312 B1 | 3/2009 | Girolami-Rose et al. |
| 7,644,101 B2 | 1/2010 | Yano |
| 7,707,162 B2 | 4/2010 | Naphade et al. |
| 7,716,636 B2 | 5/2010 | Goncharenko et al. |
| 7,735,068 B2 | 6/2010 | Siddaramappa et al. |
| 7,788,632 B2 | 8/2010 | Kuester et al. |
| 7,810,087 B2 | 10/2010 | O'Brien |
| 7,814,078 B1 | 10/2010 | Forman et al. |
| 7,844,592 B2 | 11/2010 | Shoval et al. |
| 7,877,391 B2 | 1/2011 | Bird et al. |
| 7,958,494 B2 | 6/2011 | Chaar et al. |
| 8,037,453 B1 | 10/2011 | Zawadzki |
| 8,060,871 B2 | 11/2011 | Bernabeu-Auban et al. |
| 8,069,182 B2 | 11/2011 | Pieper |
| 8,104,018 B2 | 1/2012 | Chessell et al. |
| 8,156,092 B2 | 4/2012 | Hewett et al. |
| 8,156,120 B2 | 4/2012 | Brady |

(Continued)

OTHER PUBLICATIONS

U.S. Appl. No. 13/231,162, filed Sep. 13, 2011, Fox et al.

(Continued)

*Primary Examiner* — Jay Morrison
(74) *Attorney, Agent, or Firm* — Posz Law Group, PLC

(57) ABSTRACT

A system, method, or computer-readable medium provide a look-up table having information on roots in repositories managed by a repository manager, the roots information in the look-up table being only n-levels deep. A file request is received, including filename and filepath with root. Before checking repositories managed by the repository manager for the requested file, the look-up table is referenced to determine whether the root of the requested file exists on one of the repositories managed by the repository manager. A check of the repository is bypassed when the look-up table does not indicate that the root exists on the repository. The repository is checked for the requested file, when the root is indicated as existing on the repository. The requested file is returned, if actually found on one repository. A "fail" response is returned, if the root is not indicated as existing in the look-up table.

21 Claims, 5 Drawing Sheets

(56) References Cited

U.S. PATENT DOCUMENTS

| | | |
|---|---|---|
| 8,161,470 B2 | 4/2012 | Bottomley et al. |
| 8,225,281 B1 | 7/2012 | Hardinger et al. |
| 8,280,755 B2 | 10/2012 | Stuhec et al. |
| 8,296,251 B1 | 10/2012 | Athayde |
| 8,327,318 B2 | 12/2012 | Chaar et al. |
| 8,356,278 B2 | 1/2013 | Drissi et al. |
| 8,359,285 B1 | 1/2013 | Dicker et al. |
| 8,359,566 B2 | 1/2013 | Chaar et al. |
| 8,359,571 B2 | 1/2013 | Clemm et al. |
| 8,438,532 B2 | 5/2013 | Fox et al. |
| 8,464,205 B2 | 6/2013 | Chaar et al. |
| 8,473,894 B2 | 6/2013 | Fox et al. |
| 8,479,159 B2 | 7/2013 | Klinger et al. |
| 8,479,165 B1 | 7/2013 | Kawashima et al. |
| 8,484,617 B2 | 7/2013 | Goh et al. |
| 8,484,625 B2 | 7/2013 | Saha et al. |
| 8,499,284 B2 | 7/2013 | Pich et al. |
| 8,539,437 B2 | 9/2013 | Finlayson et al. |
| 8,543,979 B2 | 9/2013 | Arcese et al. |
| 8,572,550 B2 | 10/2013 | Fox et al. |
| 8,612,936 B2 | 12/2013 | Fox et al. |
| 8,627,270 B2 | 1/2014 | Fox et al. |
| 8,656,343 B2 | 2/2014 | Fox et al. |
| 8,745,572 B2 | 6/2014 | Zimmermann et al. |
| 8,856,724 B2 | 10/2014 | Somani et al. |
| 8,875,090 B2 | 10/2014 | Fox et al. |
| 9,043,753 B2 | 5/2015 | Fox et al. |
| 2002/0049962 A1 | 4/2002 | Kelbaugh et al. |
| 2002/0052910 A1 | 5/2002 | Bennett et al. |
| 2002/0059475 A1 | 5/2002 | Baentsch et al. |
| 2003/0046282 A1 | 3/2003 | Carlson et al. |
| 2004/0010786 A1 | 1/2004 | Cool et al. |
| 2004/0039921 A1 | 2/2004 | Chuang |
| 2004/0046785 A1 | 3/2004 | Keller |
| 2004/0117413 A1 | 6/2004 | Brown et al. |
| 2004/0210583 A1* | 10/2004 | Enko et al. ............... 707/10 |
| 2004/0230949 A1 | 11/2004 | Talwar et al. |
| 2004/0243968 A1 | 12/2004 | Hecksel |
| 2005/0086473 A1 | 4/2005 | Barkley et al. |
| 2005/0137884 A1 | 6/2005 | Baird |
| 2005/0204340 A1 | 9/2005 | Ruminer et al. |
| 2005/0289066 A1 | 12/2005 | Weare |
| 2006/0020937 A1 | 1/2006 | Schaefer |
| 2006/0037000 A1 | 2/2006 | Speeter et al. |
| 2006/0048097 A1 | 3/2006 | Doshi |
| 2006/0101092 A1 | 5/2006 | Ishida et al. |
| 2006/0149717 A1 | 7/2006 | Bird et al. |
| 2006/0150153 A1 | 7/2006 | Altman |
| 2006/0212945 A1* | 9/2006 | Donlin et al. ............... 726/29 |
| 2006/0265688 A1 | 11/2006 | Carlson et al. |
| 2007/0033567 A1 | 2/2007 | Carlson et al. |
| 2007/0050232 A1 | 3/2007 | Chang et al. |
| 2007/0061495 A1 | 3/2007 | Cummins et al. |
| 2007/0061792 A1 | 3/2007 | Atsatt |
| 2007/0089086 A1 | 4/2007 | Ortloff |
| 2007/0106630 A1* | 5/2007 | Fitzgerald et al. ............... 707/1 |
| 2007/0118899 A1 | 5/2007 | Sridhar et al. |
| 2007/0143735 A1 | 6/2007 | Clemm et al. |
| 2007/0162462 A1* | 7/2007 | Zhang et al. ............... 707/10 |
| 2007/0250829 A1 | 10/2007 | Hillier et al. |
| 2007/0277148 A1 | 11/2007 | Venolia |
| 2008/0028371 A1 | 1/2008 | Brothers et al. |
| 2008/0028378 A1 | 1/2008 | Biswas et al. |
| 2008/0066050 A1 | 3/2008 | Jain et al. |
| 2008/0127040 A1 | 5/2008 | Barcellona |
| 2008/0154965 A1 | 6/2008 | Pedersen |
| 2008/0178154 A1 | 7/2008 | Basler et al. |
| 2008/0229300 A1 | 9/2008 | O'Brien |
| 2008/0235680 A1 | 9/2008 | Strauss et al. |
| 2008/0263505 A1 | 10/2008 | StClair et al. |
| 2008/0270374 A1 | 10/2008 | Li et al. |
| 2008/0281904 A1 | 11/2008 | Conrad et al. |
| 2008/0307267 A1 | 12/2008 | Chandrasekaran |
| 2008/0313595 A1 | 12/2008 | Boulineau et al. |
| 2009/0013310 A1 | 1/2009 | Arner et al. |
| 2009/0055809 A1 | 2/2009 | Campbell |
| 2009/0064114 A1 | 3/2009 | Bottomley et al. |
| 2009/0094572 A1 | 4/2009 | Hegde et al. |
| 2009/0119261 A1 | 5/2009 | Ismalon |
| 2009/0133006 A1 | 5/2009 | Cheung |
| 2009/0138843 A1 | 5/2009 | Hinton et al. |
| 2009/0144698 A1 | 6/2009 | Fanning et al. |
| 2009/0265780 A1* | 10/2009 | Korkus et al. ............... 726/22 |
| 2009/0300404 A1 | 12/2009 | Branson et al. |
| 2009/0307662 A1 | 12/2009 | Ackerman |
| 2010/0023919 A1 | 1/2010 | Chaar et al. |
| 2010/0023920 A1 | 1/2010 | Chaar et al. |
| 2010/0058291 A1 | 3/2010 | Hahn et al. |
| 2010/0058295 A1 | 3/2010 | Johnson et al. |
| 2010/0063975 A1 | 3/2010 | Hayes |
| 2010/0100543 A1 | 4/2010 | Brady |
| 2010/0106705 A1 | 4/2010 | Rush et al. |
| 2010/0153920 A1 | 6/2010 | Bonnett |
| 2010/0211924 A1 | 8/2010 | Begel et al. |
| 2010/0306730 A9 | 12/2010 | Carlson et al. |
| 2010/0325602 A1 | 12/2010 | Kraft et al. |
| 2010/0333067 A1 | 12/2010 | Goh et al. |
| 2011/0010685 A1 | 1/2011 | Sureka et al. |
| 2011/0023007 A1 | 1/2011 | Chumbley et al. |
| 2011/0023016 A1 | 1/2011 | Khader et al. |
| 2011/0055186 A1 | 3/2011 | Gopalakrishnan |
| 2011/0066619 A1 | 3/2011 | Perantatos et al. |
| 2011/0107301 A1 | 5/2011 | Chan et al. |
| 2011/0119289 A1 | 5/2011 | Fields et al. |
| 2011/0137807 A1 | 6/2011 | Cha |
| 2011/0145810 A1 | 6/2011 | Forsyth |
| 2011/0161938 A1 | 6/2011 | Marum et al. |
| 2011/0258162 A1 | 10/2011 | Lam |
| 2011/0289098 A1 | 11/2011 | Oztaskent et al. |
| 2011/0296396 A1 | 12/2011 | Kurtakov |
| 2011/0307862 A1 | 12/2011 | Abrams et al. |
| 2011/0314438 A1 | 12/2011 | Surazski et al. |
| 2012/0011496 A1 | 1/2012 | Shimamura |
| 2012/0060148 A1 | 3/2012 | Jones et al. |
| 2012/0110039 A1 | 5/2012 | Mckay et al. |
| 2012/0124547 A1 | 5/2012 | Halbedel |
| 2012/0144363 A1 | 6/2012 | Bernardini et al. |
| 2012/0159420 A1 | 6/2012 | Yassin et al. |
| 2012/0174084 A1 | 7/2012 | Chapman et al. |
| 2012/0180024 A1 | 7/2012 | Gonzalez et al. |
| 2012/0246616 A1 | 9/2012 | Frontiero et al. |
| 2012/0272205 A1 | 10/2012 | Fox et al. |
| 2012/0311534 A1 | 12/2012 | Fox et al. |
| 2012/0317546 A1 | 12/2012 | Arcese et al. |
| 2012/0324419 A1 | 12/2012 | Roberts et al. |
| 2012/0331439 A1 | 12/2012 | Zimmermann et al. |
| 2012/0331447 A1 | 12/2012 | Nayak et al. |
| 2013/0007704 A1 | 1/2013 | Haynes et al. |
| 2013/0036400 A1 | 2/2013 | Bak et al. |
| 2013/0047137 A1 | 2/2013 | Bak et al. |
| 2013/0067426 A1 | 3/2013 | Fox et al. |
| 2013/0067427 A1 | 3/2013 | Fox et al. |
| 2013/0074038 A1 | 3/2013 | Fox et al. |
| 2013/0191808 A1 | 7/2013 | Fox et al. |
| 2013/0212562 A1 | 8/2013 | Fox et al. |
| 2013/0227517 A1 | 8/2013 | Fox et al. |
| 2013/0311496 A1 | 11/2013 | Fedorenko et al. |
| 2013/0326469 A1 | 12/2013 | Fox et al. |
| 2014/0026121 A1 | 1/2014 | Jackson |
| 2014/0075414 A1 | 3/2014 | Fox et al. |
| 2014/0101633 A1 | 4/2014 | Fox et al. |
| 2014/0115562 A1 | 4/2014 | Fox et al. |
| 2014/0122424 A1* | 5/2014 | Barnes et al. ............... 707/610 |
| 2014/0156695 A1* | 6/2014 | Callaghan ............... 707/769 |

OTHER PUBLICATIONS

U.S. Appl. No. 13/233,265, filed Sep. 15, 2011, Fox et al.
U.S. Appl. No. 13/369,617, filed Feb. 9, 2012, Fox et al.
U.S. Appl. No. 13/476,160, filed May 21, 2012, Fedorenko et al.
U.S. Appl. No. 13/483,412, filed May 30, 2012, Fox et al.
U.S. Appl. No. 13/554,335, filed Jul. 20, 2012, Jackson et al.

(56) References Cited

OTHER PUBLICATIONS

Sourceforge, List of Current OSS Discovery Fingerprints [online] [retrieved on May 27, 2012] Retrieved from the internet: <http://ossdiscovery.sourceforge.net/fingerprints.html>.
Sourceforge, OSS Discovery FAQ [online] [retrieved on May 27, 2012] Retrieved from the internet: <http://ossdiscovery.sourceforge.net/faq.html>.
U.S. Appl. No. 13/780,525, filed Feb. 28, 2013, Fox et al.
Cubranic et al., "Hipikat: Recommending Pertinent Software Development Artifacts," 2003, Proceedings of the 25$^{th}$ International Conference on Software Engineering (ICSE '03), pp. 1-11.
Cubranic et al., "Hipikat: A Project Memory for Software Development," IEEE Transactions on Software Engineering, vol. 31, No. 6, Jun. 2005, pp. 446-465.
Notice of Allowance issued by the U.S. Patent Office on Jan. 22, 2013 in connection with related U.S. Appl. No. 13/089,751.
U.S. Appl. No. 14/140,167, filed Dec. 24, 2013, Fox et al.
Final Office Action issued by the U.S. Patent Office on Feb. 25, 2014 in connection with related U.S. Appl. No. 13/554,335.
Office Action issued by the U.S. Patent Office on Mar. 10, 2014 in connection with related U.S. Appl. No. 13/233,265.
Notice of Allowance issued by the U.S. Patent Office on Mar. 20, 2014 in related U.S. Appl. No. 13/476,160.
Gall et al., "Visualizing software release histories: the use of color and third dimension," IEEE International Conference on Software Maintenance, 1999 (ICSM '99) Proceedings, pp. 99-108.
Siobhan Clark et al., "Verifying components under development at the design stage: A Tool to support the composition of component design models", 1998, Google, 3 pages.
Mili et al., "Storing and Retrieving Software Components: A Refinement Based System", 1994, IEEE, 91-100.
U.S. Appl. No. 13/861,065, filed Apr. 11, 2013, Fox et al.
Milanovic et al., "Model & Metamodel, Metadata and Document Repository for Software and Data Integration", 2008, MoDELS 2008, LNCS 5301, pp. 416-430, 2008.
Sherman Steven, "A Process-Oriented Ontology for Representing Software Engineering Project Knowledge", 2009, A doctoral dissertation submitted in partial fulfillment of the requirements for the degree of Doctor of Philosophy, Graduate School of Computer and Information Sciences, Nova Southeastern University, pp. 1-244.
Notice of Allowance issued by the U.S. Patent Office on Mar. 15, 2013 in connection with related U.S. Appl. No. 13/483,412.
Office Action issued by the U.S. Patent Office on Apr. 8, 2013 in connection with related U.S. Appl. No. 13/151,816.
Ji et al., "Efficient Interactive Fuzzy Keyword Search", WWW 2009, Apr. 20-24, 2009, ACM 978-1-60558-487-4/09/04, pp. 371-380.
Happel et al., "Potentials and Challenges of Recommendation Systems for Software Development", RSSE '08, Copyright 2008 ACM 978-1-60558-228-3, pp. 11-15.
Maalej et al., "A Lightweight Approach for Knowledge Sharing in Distributed Software Teams", T. Yamaguchi (Ed.): PAKM 2008, LNAI 5345, pp. 14-25.
Office Action issued by the U.S. Patent Office on Apr. 9, 2013 in connection with related U.S. Appl. No. 13/231,162.
Gardler, "Reuse Readiness Rating", 2009, pp. 1-17, downloaded from the Internet on Apr. 1, 2013 from <url>:http://www.oss-watch.ac.uk/resources/reuseReadinessRating.
Open Source Initiative, "Home", May 5, 2010, pp. 1-2, downloaded from the Waybackmachine Internet Archive on Apr. 1, 2013.
Notice of Allowance issued by the U.S. Patent Office on Jul. 9, 2014 in related U.S. Appl. No. 13/861,065.
Froehlich et al., "Unifying Artifacts and Activities in a Visual Tool for Distributed Software Development Teams," 2004, Proceedings of the 26$^{th}$ International Conference on Software Engineering, pp. 387-396.
U.S. Appl. No. 14/271,648, filed May 7, 2014, Fedorenko.
Grundy et al., "Inconsistency management for multiple-view software development environments," 1998, IEEE Transactions on Software Engineering, vol. 24, Issue: 11, pp. 960-981.
Han, "Supporting impact analysis and change propagation in software engineering environments," 1997, Proceedings Eight IEEE International Workshop on Software Technology and Engineering Practice incorporating Computer Aided Software Engineering, pp. 172-182.
U.S. Appl. No. 13/962,122, filed Aug. 8, 2013, Fox et al.
Gacek, "Exploiting Domain Architectures in Software Reuse", 1992, ACM 0-89791-739-1/95/0004, pp. 229-232.
Prieto-Diaz et al., "Classifying Software for Reusability", Jan. 1987, IEEE Software pp. 6-16.
Meling et al., "Storing and Retrieving Software Components: A Component Description Manager", 2000, IEE, pp. 1-11.
Robillard et al., "Recommendation Systems for Software Engineering", IEEE Computer Society, 2010, pp. 80-86.
Duan et al., "Clustering Support for Automated Tracing", ASE '07, Nov. 5-9, 2007, pp. 244-253.
David, "Recommending Software Artifacts from Repository Transactions", IEA/AIE '08 Proceedings of the 21$^{st}$ International conference on Industrial, Engineering and Other Applications of Applied Intelligent Systems: New Frontiers in Applied Artificial Intelligence, 2008, pp. 189-198.
Herbsleb, "Global Software Engineering: The Future of Socio-technical Coordination," 2007, FOSE '07 2007 Future of Software Engineering, pp. 188-198.
Kagdi et al., "A survey and taxonomy of approaches for mining software repositories in the context of software evolution," 2007, Journal of Software Maintenance and Evolution: Reseach and Practice. J. Soft. Maint. Evol.: Res. Pract. 2007; 19:77-131.
Office Action issued by the U.S. Patent Office on Jun. 18, 2013 in related U.S. Appl. No. 13/369,617.
Notice of Allowance issued by the U.S. Patent Office on Jul. 11, 2013 in related U.S. Appl. No. 13/780,525.
Notice of Allowance issued by the U.S. Patent Office on Aug. 14, 2013 in related U.S. Appl. No. 13/151,816.
Notice of Allowance issued by the U.S. Patent Office on Sep. 9, 2013 in related U.S. Appl. No. 13/231,162.
Office Action issued by the U.S. Patent Office on Oct. 1, 2014 in connection with related U.S. Appl. No. 13/554,335.
Office Action issued by the U.S. Patent Office on Oct. 7, 2014 in connection with related U.S. Appl. No. 14/078,151.
Office Action issued by the U.S. Patent Office on Oct. 22, 2014 in connection with related U.S. Appl. No. 13/962,122.
Office Action issued by the U.S. Patent Office on Sep. 24, 2013 in connection with related U.S. Appl. No. 13/476,160.
Office Action issued by the U.S. Patent Office on Oct. 2, 2013 in connection with related U.S. Appl. No. 13/554,335.
Google, classpath-explorer Library which allows discovering classes at runtime, 2008. p. 1, downloaded from the Wayback Machine Internet Archive Sep. 25, 2013.
Cook et al., "An Extensible Framework for Collaborative Software Engineering", 2003, Proceedings of the Tenth Asia-Pacific Software Engineering Conference (APSEC'03), pp. 1-10.
Fitzpatrick et al., "CVS Integration with Notification and Chat: Lightweight Software Team Collaboration," CSCW'06, Nov. 4-8, 2006, pp. 49-58.
Cleland-Huang et al., "Event-Based Traceability for Managing Evolutionary Change," IEEE Transactions on Software Engineering, Vol. 29, No. 9, Sep. 2003, pp. 796-810.
Notice of Allowance issued by the U.S. Patent Office on Oct. 4, 2013 in related U.S. Appl. No. 13/369,617.
The International Search Report and The Written Opinion of the International Searching Authority mailed on Oct. 15, 2013 by the International Searching Authority in connection with international application No. PCT/US2013/041785, which corresponds to related U.S. Appl. No. 13/476,160.
Dmitriev. Safe Class and Data Evolution in Large and Long-Lived Java Applications. Mar. 2001. [retrieved on 2013-26] Retrieved from the Internet: <URL:http://citeseerx.ist.psu.edu/viewdoc/download-?doi+10.1.1.6.1812&rep+rep1&type=pdf>, entire document.
Chilowicz et al. Syntax tree fingerprinting: a foundation for source code similarity detection. Sep. 29, 2011. [Retrieved on 2013-26]. Retrieved from the Internet: <URL: http://hal-upec-mlv.archives-ouvertest.fr/docs/00/62/78/11/PDF/HAL.pdf>, entire document.
Office Action issued by the U.S. Patent Office on Oct. 23, 2014 in related U.S. Appl. No. 13/233,265.

(56) References Cited

OTHER PUBLICATIONS

Office Action issued by the U.S. Patent Office on Nov. 26, 2014 in related U.S. Appl. No. 14/102,713.
International Preliminary Report on Patentability issued by the International Bureau of WIPO on Dec. 4, 2014 in related International application No. PCT/US2013/041785.
Notice of Allowance issued by the U.S. Patent Office on Apr. 27, 2015 in related U.S. Appl. No. 13/962,122.
Podgurski et al., "Retrieving reusable software by sampling behavior", 1993, ACM Transactions on Software Engineering and Methodology, vol. 2, Issue 3, pp. 286-303.
De Luca et al., "Recovering traceability links in software artifact management systems using information retrieval methods", 2007, ACM Transactions on Software Engineering and Methodology, vol. 16, Issue 4, Article No. 13, pp. 1-50.
Ravichandran et al., "Software reuse strategies and component markets", 2003, Communications of the ACM—Program compaction, vol. 46, Issue 8, pp. 109-114.
Notice of Allowance issued by the U.S. Patent Office on May 27, 2015 in related U.S. Appl. No. 13/554,335.
Malabarba et al., "Runtime Support for Type-Safe Dynamic Java Classes", 2000, ECOOP 2000—Object-Oriented Programming Lecture Notes in Computer Science, vol. 1850, pp. 337-361.
Liang et al., "Dynamic class loading in the Java virtual machine", 1998, Proceedings of the 13$^{th}$ ACM SIGPLAN conference on Object-oriented programming, systems, languages, and applications, pp. 36-44.
Goldberg et al., "A specification of Java loading and bytecode verification", 1998, Proceedings of the 5$^{th}$ ACM conference on Computer and communications security, pp. 49-58.
Office Action issued by the U.S. Patent Office on Jun. 26, 2015 in related U.S. Appl. No. 14/102,713.
Notice of Allowance issued by the U.S. Patent Office on May 19, 2015 in related U.S. Appl. No. 13/233,265.
Williams et al., "Automatic mining of source code repositories to improve bug finding techniques", 2005, IEEE Transaction on Software Engineering (vol. 30, Issue: 6), pp. 466-480.
Ying et al., "Predicting source code changes by mining change history", 2004, IEEE Transactions on Software Engineering (vol. 30, Issue: 9), pp. 574-586.
Storey et al., "TODO or to bug: exploring how task annotations play a role in the work practices of software developers", 2008, Proceedings of the 30$^{th}$ International conference on Software engineering, pp. 251-260.

* cited by examiner

METHOD AND SYSTEM THAT ROUTES REQUESTS FOR ELECTRONIC FILES

TECHNICAL FIELD

The technical field relates in general to electronic file management, and more specifically to locating an electronic file.

BACKGROUND

A repository manager, for example, Nexus, allows administrators to logically group repositories together into a single, referred to herein as a "group repository" or a "proxy repository." This can be done for example to provide a single URL (uniform resource locator) that is stable and to allow administrators to add and remove proxies or other repositories to the group without having to have developers update their settings, etc. This also introduces some level of control over how artifacts are fetched from those repositories.

When a request for an artifact comes in to a conventional group repository, the group repository can work down a list of repositories included in the group repository, in order from top to bottom looking to see if any repository has the requested artifact. The first one that has it, "wins" and it is the artifact from this repository which is served to the client. In a conventional system, the ordering of the list can be important because it allows administrators to provide "overrides" to project object models (poms) and artifacts by placing them in a repository that is higher in the search list.

For metadata requests from a repository manager, typically the repository will hit all repositories in the list for the requested metadata and effectively merge all of the metadata together. This is done because the metadata is typically enumerating all versions of an artifact and the system must look everywhere to present the complete picture back to the client.

Each proxy repository can cache the artifacts it has retrieved from the remote system with the repository, and a repository can include a negative cache (the so-called Not Found Cache "NFC") that denominates artifacts that are not located in a particular repository. The cache and negative cache can be done to speed up the artifact lookups and ensure that the repository manager does not keep asking the remote repository over and over for an artifact that the repository manager knows is not present on the remote repository.

The ordering of repositories in the list of repositories can be important for performance reasons. Since it is obviously lower cost to hit the locally hosted repository rather than a proxy, one would typically want to search these first. A typical repository manager does not necessarily enforce this to be the case though and can, e.g., allow the administrator the ultimate authority in determining the lookup order.

The repository manager can provide an additional mechanism sometimes referred to as "routing rules" to optimize lookups. These are regular expressions that operate on group repositories and can effectively declare statements such as:

for every request to com/sonatype/* you may only look in "releases" and "snapshots". In other words, they can never be anywhere else for every request to com/jboss/ you may NOT look in "releases" or "snapshots". In other words, jboss artifacts can never be here Proper configuration of routing rules can have immense performance impact and can reduce the amount of repositories that must be searched before serving back the requested artifact. When the number of repositories in a group gets very large, even the NFC is not very efficient because it holds an item for each artifact-repository combination and thus for a given size of the NFC cache, the system can store fewer artifacts in memory.

In operation, a conventional repository manager can receive a request for a component, for example by file name. The repository manager includes a list of upstream repositories. Sometimes the repository manager receives a request for a component that is not present on one of the repositories. The repository manager's job in that situation is to try and find it in the other repositories.

Consider a situation that a file name/artifact "com/sonatype/projecta/foo1.0.jar" was requested but not found. NEXUS (as an example repository manager) is configured with a list of repositories; the repository manager will go sequentially to each repository in the repository list to look for the requested artifact; if the artifact exists only in the last repository in the list, then the repository manager will go out to all of the other repositories to check for the requested artifact. In this example, "com/sonatype" does not exist. One of the next requests happens to be for "com/sonatype/projecta/foo2.0.jar". The conventional system looks for this file, using the entire path—even though "com/sonatype" did not exist. The conventional system does no introspection and thus does not determine that part of a path (e.g., "com/sonatype") is not there and hence none of the files in the path will be found.

As another example, today's conventional systems receive a "get" request for a file (a1.0) from sonatype.com, and the repository manager will then blindly make a "get" request for the file a1.0 to each of the repositories that it manages. The repository manager then will remember that none of the repositories has the file a1.0. A request for a2.0 from sonatype.com will again result in sending a "get" request for a2.0 to each of the repositories. If file is not found, a "fail" will be returned to the "get" request.

The trouble with the routing rules used by conventional systems is that while they are very powerful, they are often underutilized by administrators. This is partly because they are hard to configure properly, and because the most optimal rules are the most strict and end up having to be changed every time a new proxy is added or if a user needs artifacts with a new groupId. In other words, it is hard to define where not to look for everything until the system already knows where it is, and so it is hard to efficiently route requests for completely foreign components that have never been requested before.

Another problem in operation of the conventional system is that the cache might have stored a file, but the fact is important information is usually lost due to being evicted from the cache because there are so many users. There may be requests for 20,000 to 30,000 or more files a day. Caching information for 10,000 files is simply insufficient as a practical matter.

SUMMARY

Accordingly, one or more embodiments provide a computer system.

A computer system that manages requests for files. The computer system includes a look-up table storage configured to store a look-up table having information on roots that are stored on repositories managed by a repository manager, the information on the roots in the look-up table being only n-levels deep; and a processor. The processor is cooperatively operable with the look-up table storage. The embodiment includes receiving a request for a file, the request including a file name and a file path with a root. Also, before checking repositories managed by the repository manager for the requested file, the system determines by reference to the look-up table whether the root of the requested file exists on one of the repositories managed by the repository manager. The system will bypass a check of the one of the repositories when the look-up table does not indicate that the root exists on the repository. The system will check the repository for the requested file, when the root is indicated as existing on the repository. The system will return the requested file, if found on at least one of the repositories. A "fail" response is returned to the request for the file, if the root of the requested file is not indicated as existing in the look-up table.

In another embodiment, the n-levels is predetermined at two levels. In yet another embodiment, the n-levels is predetermined at three levels.

In another embodiment, the look-up table is built by crawling remote systems that host the repositories to only n-levels, and the look-up table that is built is stored, e.g., in the look-up table storage.

In yet another embodiment, the look-up table is built by receiving an advertisement from a remote system that hosts the one of the repositories, the advertisement indicating the remote system lookup table to the repository manager.

In still another embodiment, the look-up table at two or three levels deep only, corresponding to the predetermined two or three levels.

In still a further embodiment, the system/method will periodically refresh the look-up table, by at least one of (a) sending a request to a remote system that hosts one of the repositories, for a refresh of the look-up table of the remote system, and (b) re-crawling folders at the remote system that hosts one of the repositories to only n-levels to re-confirm content in the look-up table.

Another embodiment provides for sending, to a remote system that hosts one of the repositories, a request for an advertisement, the advertisement indicating to the repository what part of the path the repository manager does not have, so that the repository manager can be updated. The lookup table is built by receiving the advertisement from the remote system that hosts the one of the repositories, the advertisement indicating the remote system lookup table to the repository manager.

A further embodiment is a computer-implemented method relating to one or more of the above embodiments.

Still another embodiment is a non-transitory computer-readable medium comprising instructions for execution by a computer, the instructions including a computer-implemented method for managing requests for files, the instructions for implementing the method in a processor.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
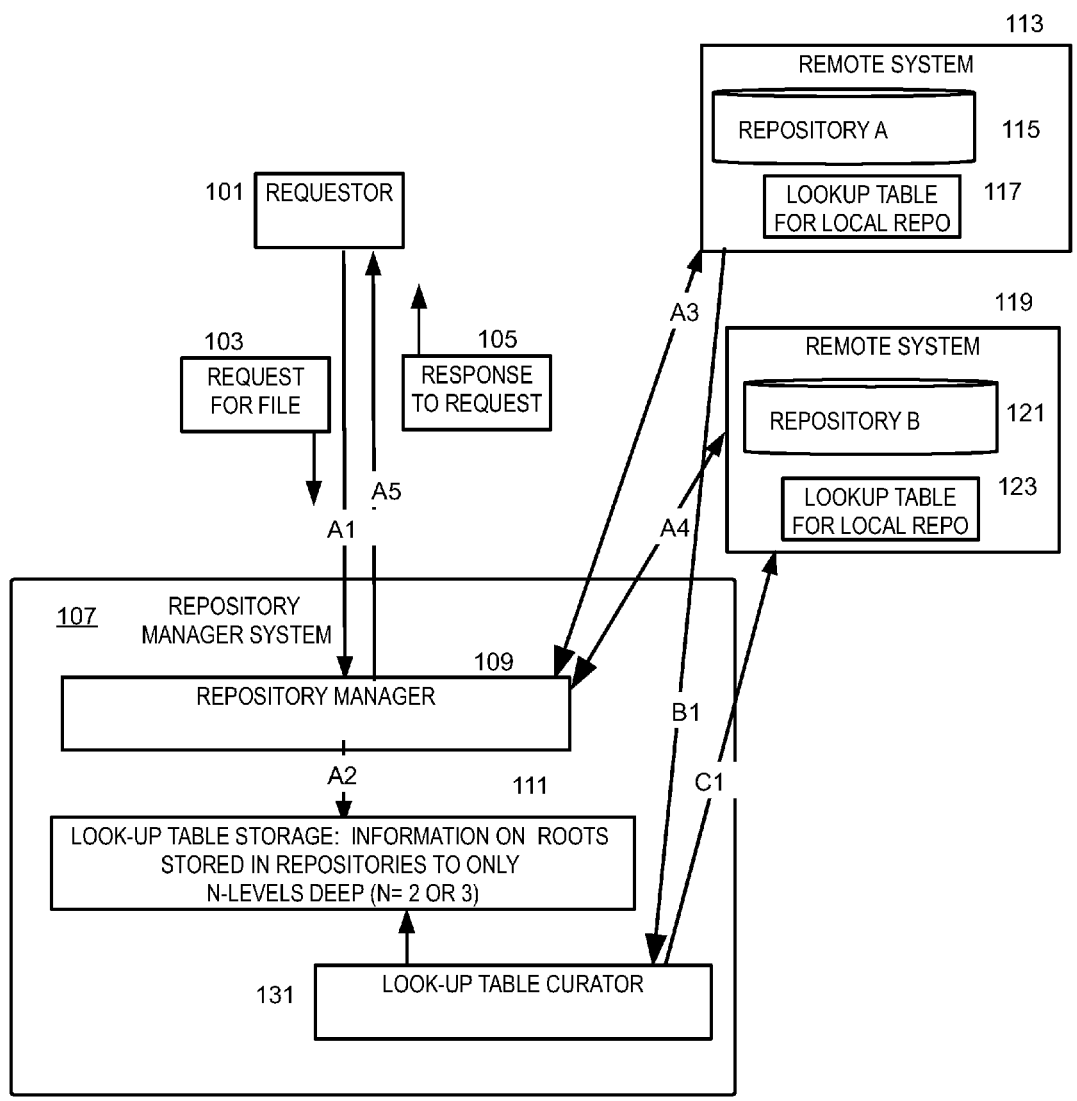
FIG. 1 is a block diagram illustrating a block diagram with data flow for file requests.

In overview, the present disclosure concerns software development, in which an application comprises different self-contained components, such as classes, which can be loaded into a virtual machine which then runs the application. One of the self-contained components of the software is discovered to be "broken," that is, to need an update for any of various reasons, such as to correct an error, to correct a vulnerability, to provide a minor improvement, or similar can be updated so that the un-updated piece of software needs to be replaced; a "fixed" component is provided which has the correction. Even though the broken component of the software needs to be replaced, it is not necessary to replace the other, non-broken components of the software. More particularly, various inventive concepts and principles are embodied in systems, devices, and methods therein for replacing broken classes in the software application with fixed classes, or doing the same for a pre-defined portion of the class, without replacing the non-broken classes in the application, in the byte code of the application or even while the application is fully executing.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

DEFINITIONS

The claims may use the following terms which are defined to have the following meanings for the purpose of the claims herein. Other definitions may be specified in this document.

The term "class" is used herein to indicate a re-usable piece of code which is self-contained, has a predetermined framework, and in its compiled form is used to construct an application. For Java, the term "class" can be further defined in accordance with Java specifications.

The term "component" used herein is defined to be a specific version of pre-existing executable software, or a reusable pre-existing self-contained software code building block which is not a complete stand-alone finished product ready for use and which is binary or source code. A component is the subject of a license or a target of a security vulnerability. Less formally, a component which is part of a stand-alone product can be understood to be a self-contained bit of code which a developer does not wish to write himself/herself as part of the stand-alone product, and so the developer uses a previously existing component for which the functionality likely was previously vetted as a part of another stand-alone product.

The term "computer system" or "computer" used herein denotes a device sometimes referred to as a computer, laptop, personal computer, personal digital assistant, notebook computer, personal assignment pad, server, client, mainframe computer, or evolutions and equivalents thereof.

"Open source" software is defined herein to be source code that allows distribution as source code as well as compiled form, with a well-publicized and indexed means of obtaining the source, optionally with a license that allows modifications and derived works.

The term "Open Source Definition" is used herein to mean the Open Source Definition available from the Open Source Initiative, variations and evolutions thereof.

The term "repository" or "software repository" used herein are defined to mean an electronic storage system that stores, in a defined directory structure, software build components (sometimes referred to as an "artifact") and dependencies for later retrieval, to which artifacts are published in accordance with procedures which are well known to those in the field, so that artifacts made by one software developer are published to be available for further use by other software developers, to be incorporated as building blocks to build software products which can be executed; a repository can include a computer server by which the stored electronic copies of artifacts are made available for use by software developers to be incorporated as building blocks to build software products which can be executed; the repository typically has a unique identifier that indicates the software developer (an individual or a group) that contributed the artifact. A repository can be remote or local. Examples of repositories include the MAVEN repository, as well as repositories maintained by Red Hat, Oracle, and Codehaus organizations, and others.

The term "repository manager" refers to a type of repository that includes a proxy of external software repositories, among other features. A "repository manager" typically can provide infrastructure to manage software artifacts, along with other features.

The term "software build" used herein specifically is defined to mean a process as pre-defined in an executable build program of converting a plurality of components (sometimes obtained from a repository) and combining the results into an executable stand-alone computer program or a software component for use in a further software build, including at least compiling components and linking compiled components and possibly binary components (which can be from the repository), in a pre-determined order as defined in the build program.

The term "compiler" is used herein specifically to mean a computer program(s) that transforms source code written in a programming language into a target language that is readable by a computer, often in the form of binary code or bytecode, so as to create an executable program.

END OF DEFINITIONS

What is needed is a more efficient way to look up a component from a repository having a defined path/defined structure. The retrieval of artifacts from an ordered repository can be improved; if the ordering of the repository is known, some massive optimizations can be made in how the search is approached.

In overview, given a pre-defined structure for a repository, one or more embodiments can improve the look-up based on the on the pre-defined repository structure.

As further discussed herein below, various inventive principles and combinations thereof are advantageously employed to exclude search paths in the remote repositories, by looking one to two levels down in each of the remote repositories. Thus, the system can immediately exclude entire masses of paths—if it is known that a repository has no "com.anything" there is no need to look there.

Further in accordance with exemplary embodiments, there is provided a method and system that resolve the issues mentioned above relatively quickly. The request is looking for a component. More generically, this is a request for a file with a defined path—this is not a simple request for a file with the name "foo.jar". This is a request for the defined path "com/sonatype/ProjectA/foo.jar". The path is normally derived from the inverse of the DNS. For example, in the Sonatype repository, the request is for "com/sonatype/projectname/artifactID/version/filename.xxx". The group ID (sometimes referred to as the GAV) is "com.Sonatype.projectname", which is converted in the repository to "com/Sonatype/projectname". The artifact ID "artifactID" is next, followed by the version "version", followed by the actual file name "filename.xxx". What is unique here is that, knowing that information, the system can know automatically by looking at a repo, if there is no "com", or if there is a "com" but no "com/sonatype", then if there is a request for a file on "com/sonatype", it is automatically known to not look at the repository since it is known to not exist in the repository. In short, the system disclosed herein will determine that it is known that "com/sonatype" does not exist and immediately knows that the file which includes that as part of its defined path name is not there without searching for the file name.

Referring now to FIG. 1, a block diagram with data flow will be discussed and described. FIG. 1 illustrates a requestor 101, a repository manager system 107, and two remote systems 113, 119 which are representative of plural remote systems.

The requestor 101 is typically a computer programmed using conventional techniques to transmit, to the repository manager system 107, a request for a file 103 and to receive a response 105 to the request for the file. Expected responses to the request for the file include, a transfer of the file itself; or an indication that the file was not retrieved or the request for some reason was not successful (collectively referred to herein as a "fail" indication).

The remote systems 113, 119 each can include one or more repositories of artifacts, herein represented by repository A 115 and repository B 121. The repositories can be structured according to known techniques. Also, one or more of the remote systems 113, 119 can include its own lookup table 117, 123 for its locally accessible artifacts which are in its own local repository 115, 121; the local lookup table can be made using known techniques and can be used by the remote system 113, 119 to track the artifacts locally available in its repository 115, 121. The remote systems 113, 119 can omit the local lookup table 117, 123.

The repository manager system 107 can include a repository manager 109, a look-up table storage 111, and a look-up table curator 131. The repository manager 109 can receive the request 103 for the file from the requestor 101 and can return the response 105 to the request. The look-up table storage 111 includes information on roots stored in repositories to only a predetermined N-levels deep; N is usually 2 or 3 so that information looked-up in the look-up table storage can be limited the root at N levels. The repository manager 109 can access the look-up table storage 111 to look up whether the root of the file name exists on one of the repositories which the repository manager 109 manages, without checking for the entire file name.

The file is name in the request 103, and usually includes a file name and at least a name of a source or group, which collectively can resolve to a full path name.

Maven repositories follow a well defined layout of /groupId/artifactId/version and further, the groupId is typically a global identifier that is the inverse of a company's DNS. (ie com.sonatype). The groupId's "." are converted into "/" so the system can end up converting, for example, com.sonatype to com/sonatype. For example, if a tool such as Maven receives a request looking for version 1.2.0 of the commons-lang JAR in the group org.apache.commons, the file name in the request can be translated using known techniques into a root-first-filename-last layout, starting with URL and inverse DNS:

<repoURL>/org/apache/commons/commons-lang/1.2.0/commons-lang-1.2.0.jar

Using some knowledge about this structure, the system can create routing rules that can yield massive performance benefits.

FIG. 1 will now be used to discuss a normal course of use, when requestor 101 transmits a request 103 for file and receives a response 105 to the request. Consider a first situation that a desired artifact happens to be located on repository A 115. At step A1, Requestor 101 transmits the request 103 for the file (e.g., an FTP (file transfer protocol) "get" command) that specifies the file name. The repository manager 109 receives the request 103, and optionally translates the filename into root-first-filename-last format. At step A2, the repository manager 109 checks the look-up table storage, which holds information on roots stored in repositories to only N-levels deep, as to whether the root of the requested file is present on any of the repositories (including a repository that may be local) 115, 121. Because the look-up table storage 111 indicates that the root (N-levels deep) is present on repository A 115, at step A3 the repository manager requests and receives the file from repository A 115. Then, at step A5, the repository manager 109 returns the response 105 which includes the file to the requestor.

Consider a second situation that the desired artifact is in a root which is not present in repository A, but is present in a root on repository B. The same step A1 occurs as before, and at step A2, the repository manager 109 finds that the root of the requested file is not present in repository A, but is present in repository B. Step A3 is bypassed, and at step A4, the repository manager requests and receives the file from repository B 119. As before, at step A5, the repository manager returns the response 105 with the file to the requestor 101. In a conventional system, step A3 is performed (and fails to find the file) before step A4 is performed.

Consider a third situation that the root of the desired artifact is present in repository A and B, but the desired file is not present in either repository where the desired artifact is expected. This is the worst case scenario, in which the same step A1 occurs as before, and at step A2 the repository manager finds that repositories are present on both remote systems 113, 119. At step A3, the repository manager 107 requests the file from remote system 113 (which fails), and at step A4 the repository manager 107 requests the file from remote system 119 (which also fails). At step A5, the repository manager returns a "fail" in the response 105 to the requestor 101. This scenario is unlikely in the usual development situation in which repositories are used, because if none of the remote systems have the desired artifact but have the root then it is likely only because the desired artifact was very recently published and in the usual course a developer likely would check again later. So this scenario should be rare.

Consider a fourth situation that the root of the desired artifact was not present in any of the remote systems 113, 119 managed by the repository manager system. Again, step A1 occurs, and at step A2, the repository manager 109 finds that the root of the requested file is not present in any managed repository 115, 121. Steps A3 and A4 are bypassed. Step A5 returns the response 105 with a "fail". In a conventional system, both of steps A3 and A4 are performed and fail to find the file; these steps can be relatively time-consuming.

The look-up table curator 133 is now described in some more detail. The look-up table curator 133 can be tasked to manage information in the look-up table 133. The information in the lookup table is limited to N-levels, e.g., 2 or 3 levels. In that case, the lookup table can list the repository URL and inverse DNS (2 levels), or the repository URL and inverse DNS and group name (3 levels). By limiting the information to 2 or 3 levels, the size of the lookup table 133 is small and the looking up in the lookup table 133 is quick, whether or not the lookup returns a file failure or not. The look-up table curator 133 can obtain information on the N-levels which are present on a repository 115, 121. This can be obtained by the curator 133 examining one or more of the repositories 115, 121 such as by crawling (represented by step C1); by the curator 133 interrogating one or more of the remote systems 113, 119 whether paths (or N-levels of paths) are present (also represented by step C1); by the curator 133 requesting updated lookup table information from one or more of the remote systems 113, 119 (also represented by step C1); by the curator 133 receiving published information about the lookup table from one or more of the remote systems 113, 119 (represented by step B1); and/or a combination of two or more of the foregoing.

For example, the curator 133 can crawl (using known techniques) a repository 115, 121 to a max depth of a predefined shallow number of levels, such as two (2) levels. For the majority of repositories, crawling to a depth of only two levels would require only a handful of requests yet it would gain a tremendous amount of data that can be fed into the routing rules. The system can use the information gained to create negative regular expressions that would exclude everything not discovered in this crawl. For example, if a repo contains only /org/someforge, then the system would make an exclusion rule for (!?/org/someforge).*

The frequency of the remote checks can be configurable per repository, in some implementations.

As another example, Nexus instances on one or more repositories 115, 121 can publish a rules file using known techniques in /.meta that the repository manager system 107 can use to build rules on the downstream side without crawling. The metadata optionally can declare the frequency of updates allowed. When publishing is enabled, the remote system 113, 119 can update the metadata file as soon as a new artifact is published that would change the rules. The publisher may choose to publish data down to a predetermined number of levels, for example, two (2) or three (3) levels.

If the repository manager system 107 sees a metadata file being published (using conventional techniques), the repository manager system 107 can use the published metadata file with the local lookup table update for the repository 115, 121 and avoid scraping that repository which published the lookup table update.

The data flows are illustrated herein by way of example to further understanding of the principles discussed here. Actual implementations can omit one or more portions of the data flows, and/or can include other data flows which are within the scope and spirit of the discussion herein.

Figure 2:
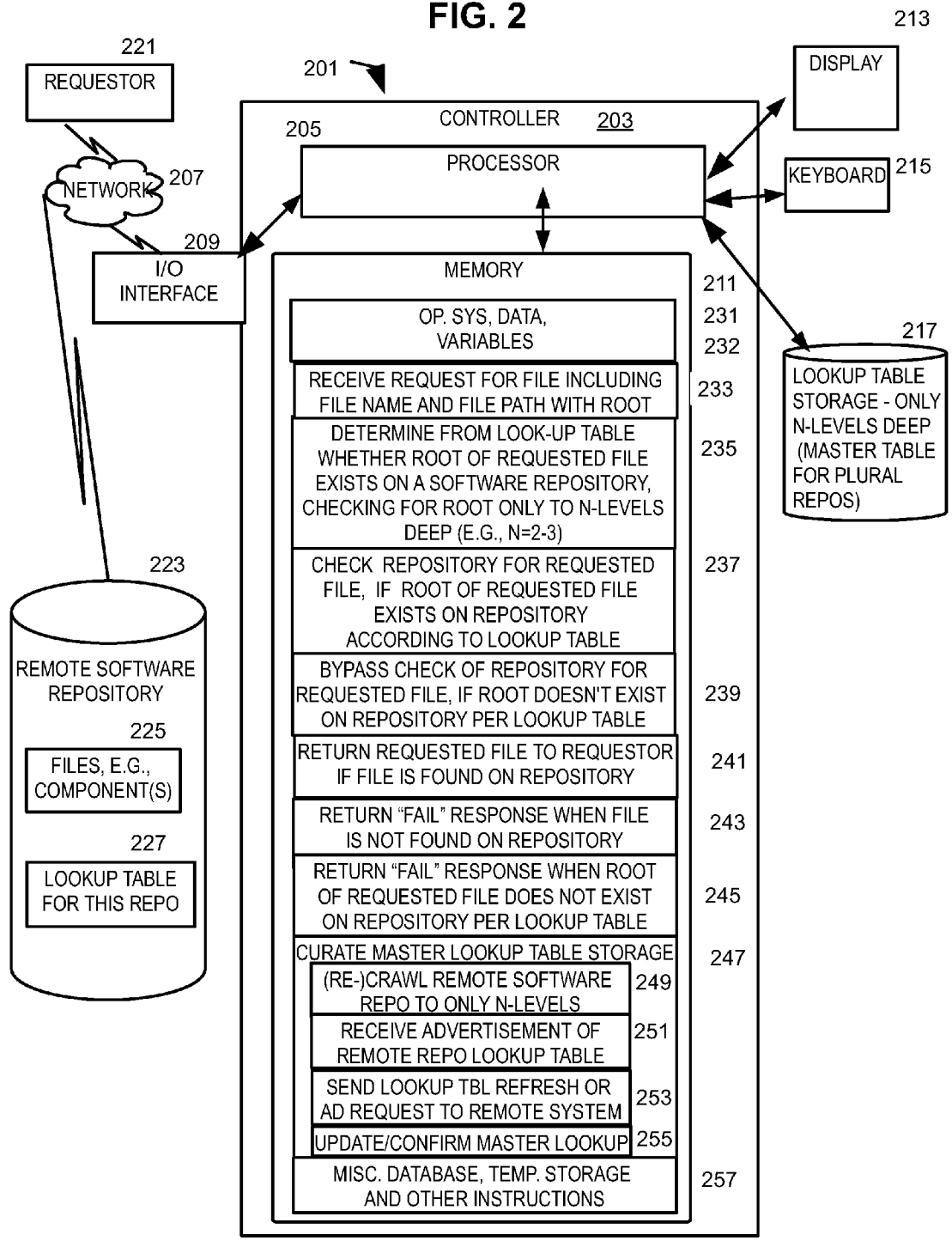
FIG. 2 is a block diagram illustrating relevant portions of a computer system.

Referring now to FIG. 2, a block diagram illustrating relevant portions of a computer system will be discussed and described. The computer 201 may include one or more controllers 203, a processor 205, an input/output (i/o) interface 209 for communication such as with a network 207, a memory 211, a display 213 (optional), and/or a user input device (optional) such as a keyboard 215. Alternatively, or in addition to the keyboard 215, a user input device may comprise one or more of various known input devices, such as a keypad, a computer mouse, a touchpad, a touch screen, a trackball, a voice recognition device and microphone, and/or a keyboard. The display 213 may present information to the user by way of a conventional liquid crystal display (LCD) or other visual display, and/or by way of a conventional audible device (e.g., a speaker) for playing out audible messages. Portions of the computer 201 are well understood to those of skill in this area and have been omitted to avoid obscuring the discussion.

The processor 205 may comprise one or more microprocessors and/or one or more digital signal processors. The memory 211 may be coupled to the processor 205 and may comprise a read-only memory (ROM), a random-access memory (RAM), a programmable ROM (PROM), and/or an electrically erasable read-only memory (EEPROM). The memory 211 may include multiple memory locations for storing, among other things, an operating system, data and variables 231 for programs executed by the processor 205; computer programs for causing the processor to operate in connection with various functions such as receiving 233 a request for a file (or artifact), determining 235 from the lookup table whether the root of the requested file exists on the repository, checking 237 the repository for the requested file in the event that the root exists on the repository according to the lookup table, bypassing 239 the check of the repository for the requested file in the event that the root does not exist on the repository according to the lookup table, returning 241 the requested file to the requestor if the file is found on the repository, returning 243 a "rail" response to the requestor when the file is not found on the repository, returning 245 a "fail" response when the root of the requested file does not exist on any repository per the lookup table, and curating 247 a lookup table storage 217; and a database 257 for other information and/or instructions used by the processor 205. The computer programs may be stored, for example, in ROM or PROM and may direct the processor 205 in controlling the operation of the computer 201. Each of these functions is considered in more detail herein, to the extent that it is not detailed elsewhere in this document. Many of these functions can be incorporated into a repository manager. A conventional repository manager is known to those of skill in this field, and consequently is not detailed in this document.

The user may invoke functions accessible through the user input device such as the keyboard 215, and/or through commands received via the i/o interface 209 such as may be initiated from a requestor 221 (here illustrated as communicating over the network 207, though the requestor 221 may have a local connection). The user input device may comprise one or more of various known input devices, such as a keyboard (215, illustrated) and/or a pointing device, such as a mouse; the keyboard 215 may be supplemented or replaced with a scanner, card reader, or other data input device; and the pointing device may be a mouse, touch pad control device, track ball device, or any other type of pointing device.

The display 213 is representative of a display that may present information to the user by way of a conventional liquid crystal display (LCD) or other visual display, and/or by way of a conventional audible device for playing out audible messages.

Responsive to manual signaling from the user input device represented by the keyboard 215, in accordance with instructions stored in memory 211, and/or automatically upon receipt of certain information via the i/o interface 209, the processor 205 may direct the execution of the stored programs.

The computer 201 can access a remote software repository 223 on which is stored one or more files or components, here represented by component(s) 225, which is representative of one or more files or components. Although the components 225 are illustrated as accessed over the network 207, the components 225 may be remotely and/or locally accessible from the computer 201, over a wired and/or wireless connection; the components 225 do not need to be limited to a database or a software repository 223. Techniques are known for accessing components located in a software repository 223, and the like. The remote software repository 223 optionally can include its own lookup table which lists directories (e.g., at least partial file paths) which are present at its own repository 225.

The processor 205 may be programmed for receiving 233 a request for a file (or artifact), in which the file is identified with the file name and the file path including at least the root and possibly the group, project and/or version, or other optional parts of the pathname. The request for a file can be received using known techniques. Also, the request can be formatted according to known protocols, such as a typical ftp "get" file request or similar. Alternatively, a request in any format known to the processor 205 can be made.

The processor 205 may be programmed for determining 235 from the look-up table 217 whether the root of the requested file exists on the repository, checking the lookup table for the root, only to pre-determined N-levels deep in the pathname. The number N of levels typically is two or three, which is sufficient to provide a quick lookup. The lookup table need only include the N-levels of information. The request is for a file that correlates to a defined path, e.g., "com/sonatype/ProjectA/foo.jar" where foo.jar is the file name and com/sonatype is 2-levels of the root; a third level of the root includes the group ID, sometimes referred to as the project ID or GAV. The path is normally derived from the inverse of the DNS. For example, in the Sonatype repository, a request for "com/Sonatype/projectname/artifactID/version/filename.xxx". The group ID (sometimes referred to as the GAV) is "com.Sonatype.projectname", which is converted in the repository to "com/Sonatype/projectname". The artifact ID "artifactID" is next, followed by the version "version", followed by the actual file name "filename.xxx". By looking at a repository in the look-up table 217, the processor 205 can determine whether there is a "com" (first level), or whether there is a "com" but no "com/sonatype" (first and second levels, corresponding to "sonatype"). For a request for a file with a pathname two levels deep of "com/Sonatype", it is determined by looking at the lookup table 217 to not look at the repository since it is known to not exist in the repository.

The processor 205 may be programmed for checking 237 the repository for the requested file in the event that the root exists on the repository according to the lookup table. Once the processor 205 has determined that the root exists on the repository, known techniques can be used to request the file from the repository. For example, an ftp "get" request can be transmitted from the processor 205 to the remote software repository 223 for the file. The request for the file from the remote software repository 223 will succeed if the file is actually present on the remote software repository 223, or fail if the file is not actually present.

The processor 205 may be programmed for bypassing 239 the check of the repository for the requested file in the event that the root does not exist on the repository according to the lookup table. When it is determined that the lookup table 217 does not list the root as existent on the repository, there is no need to check that particular repository that lacks the root for the file whose pathname includes the root. When it is determined that none of the repositories listed in the lookup table 217 includes the root, then the processor 205 does not request the file from any remote software repository 223 for which the lookup table 217 does not list the root as existent.

The processor 205 may be programmed for returning 241 the requested file to the requestor 221 if the file is found on the repository. Conventional techniques can be used to return the file to the requestor 221, for example, the usual response to an ftp "get" file request.

The processor 205 may be programmed for returning 243 a "fail" response to the requestor when the file is not found on the repository, or on any of the repositories which the repository manager manages. In this situation, the root is known to be existent on one or more remote software repositories 223 which the repository manager manages, but requests for the file to the repositories on which the root exists were unsuccessful.

Also, the processor 205 may be programmed for returning 245 a "fail" response when the root of the requested file does not exist on any repository 223 per the lookup table. This is the situation that the root is not known to be existent on any of the repositories which the repository manager manages. The designation "fail" response as discussed herein can be a conventional ftp "get" file request "fail", or similar designation for other file requests.

The processor 205 may be programmed for curating 247 the master lookup table storage. The curating 247 function conveniently can be programmed as a background process which executes independently of and without being initiated by the file requests to/from the software repository manager. The lookup table storage 217 can include a master table for plural software repositories which will be accessed by the repository manager. The curating 247 function essentially performs a look-ahead to understand the contents of repositories and to prepare an internal mapping (in the lookup table 217) of the N-levels which are existent on each of the repositories. The internal mapping of the lookup table 217 guides the lookup, by indicating what roots each of the repositories do have.

Some conventional repository managers have a concept where an administrator can pre-define rules that dictate where to look or where to not look for files. Other conventional repository managers are based on the concept that, when a repository is defined, parameters are manually entered that indicate what kinds of things are contained in the repository; the problem is that people forget to update what is indicated or they let the system find out on its own and a performance penalty is paid for doing that. That is, a conventional repository manager will be incorrect even if it has been manually defined initially; and any flaw (minor or major) will affect performance. In comparison, the present system can for example pre-crawl repositories, or the remote repository can advertise this information to the repository manager, so that the repository manager has the lookup information before receiving the request for the file.

The curating 247 can include one or more of crawling/re-crawling 249 one or more remote software repositories, receiving 251 an advertisement of a remote repository lookup table, sending 253 a lookup table refresh request or an advertisement request to a remote system with one or more software repositories. Also, the curating 247 can include a function of updating/confirming 255 the master lookup table in the lookup table storage 217. These are discussed further below.

The processor 205 may be programmed for crawling/re-crawling 249 one or more remote software repositories. The repository can be crawled, for example, two levels deep (because that is not considered to be abusive), or possibly three levels deep. More than two layers might be considered to be abusive because that might be thousands or hundreds of thousands of directories. At two levels, that will indicate whether a repository has, e.g., "com/sonatype". Even if it has "com/sonatype", this two level deep crawl will not indicate whether the remote repository has projectA, projectB, or projectC. However, the point is, that even knowing two levels saves 90% of the performance.

The processor 205 may be programmed for receiving 251 an advertisement from the remote repository 223 of a remote repository lookup table 227. For example, the downstream system can advertise the path to the repository manager, using known techniques for advertising information and including the N-levels of its paths. The advertisement can include an entire look table, or lookup table information to N-levels, or lookup table information which is added or deleted from the remote software repository 223. The processor 205 can update 255 the lookup table 217 to include, in connection with the identification of the remote software repository, the new information and/or to confirm that the advertised information is present.

The processor 205 may be programmed for sending 253 a lookup table refresh request or an advertisement request to a remote system with one or more software repositories. The lookup table refresh request can result in the remote software repository 223 forwarding its lookup table 227 to at least N-levels deep to the software repository manager. The processor 205 can update 255 the master lookup table 217 to include this information in connection with the remote software repository identification.

As will be understood in this field, besides the functions discussed above, the memory 211 can include other miscellaneous information in a misc. database 257, along with the usual temporary storage and other instructions for other programs not considered herein.

The computer 201 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 205, memory 211, a disk drive and/or removable storage medium are referred to as "computer-readable storage media" and provide non-transitory storage of computer programs and data.

The lookup table storage 217 is illustrated as locally accessible storage (disk, memory, and/or database). The lookup table storage 217 alternatively can be remotely accessible storage. The lookup table storage 217 can be configured with N-levels deep of path names. The lookup table 217 can list repository ID (which is a unique identifier, for example a global URL), and for the repository ID (e.g., repository URL) can list N-levels of path which are existent on the repository (e.g., two levels is domain name (top level domain (e.g., .com, .net, etc.) plus hostname, e.g., "Sonatype" in sonatype.com). There are various definitions of domain name formats, and known techniques for looking up domain names such as from IP address. The point is, a pre-defined N levels (but no more) of information in a path name of a file are used to prevent checking for the file; this provides a very quick turn-around time, prevents needlessly checking in a cache, and prevents needlessly querying the remote repository.

A simple example of an N-level lookup table with N=2, in which the repository manager manager=s repository A (RepoA.com) and repository B (RepoB.com) which are on URLA and URLB, respectively, is:

| <URLA> | /com/RepoA |
|---|---|
| <URLB> | /com/RepoB |

A simple example of an N-level lookup table with N=3, in which the repository manager manages repository A (RepoA.com) and repository B (RepoB.com) which are on URLA and URLB, with groups ProjectA and ProjectB on RepoA, and groups ProjectB and ProjectC on RepoB, is:

| <URLA> | /com/RepoA/ProjectA |
|---|---|
|  | /com/RepoA/ProjectB |
| <URLB> | /com/RepoA/ProjectB |
|  | /com/RepoA/ProjectC |

It should be understood that FIG. 2 is described in connection with logical groupings of functions or resources. One or more of these logical groupings may be omitted from one or more embodiments, for example, functionality of curating 247 the master lookup table storage might omit one or more of the different ways to obtain the remote lookup table information; that is, one or more of crawling 249 the remote software repository, receiving 251 advertisements of the remote repository lookup table, and sending lookup table refresh and/pr advertisement request can be omitted. Similarly, the curating 247 of the master lookup table can be performed on a different processor. Also, the controller 203 may itself include a software repository which can be listed in the lookup table storage 217 and from which components, artifacts, or files can be retrieved for the requestor 221. Furthermore, although the requestor 221 is illustrated as being connected over the network 207, the requestor 221 can be local for example, a local process on the processor or similar. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 3:
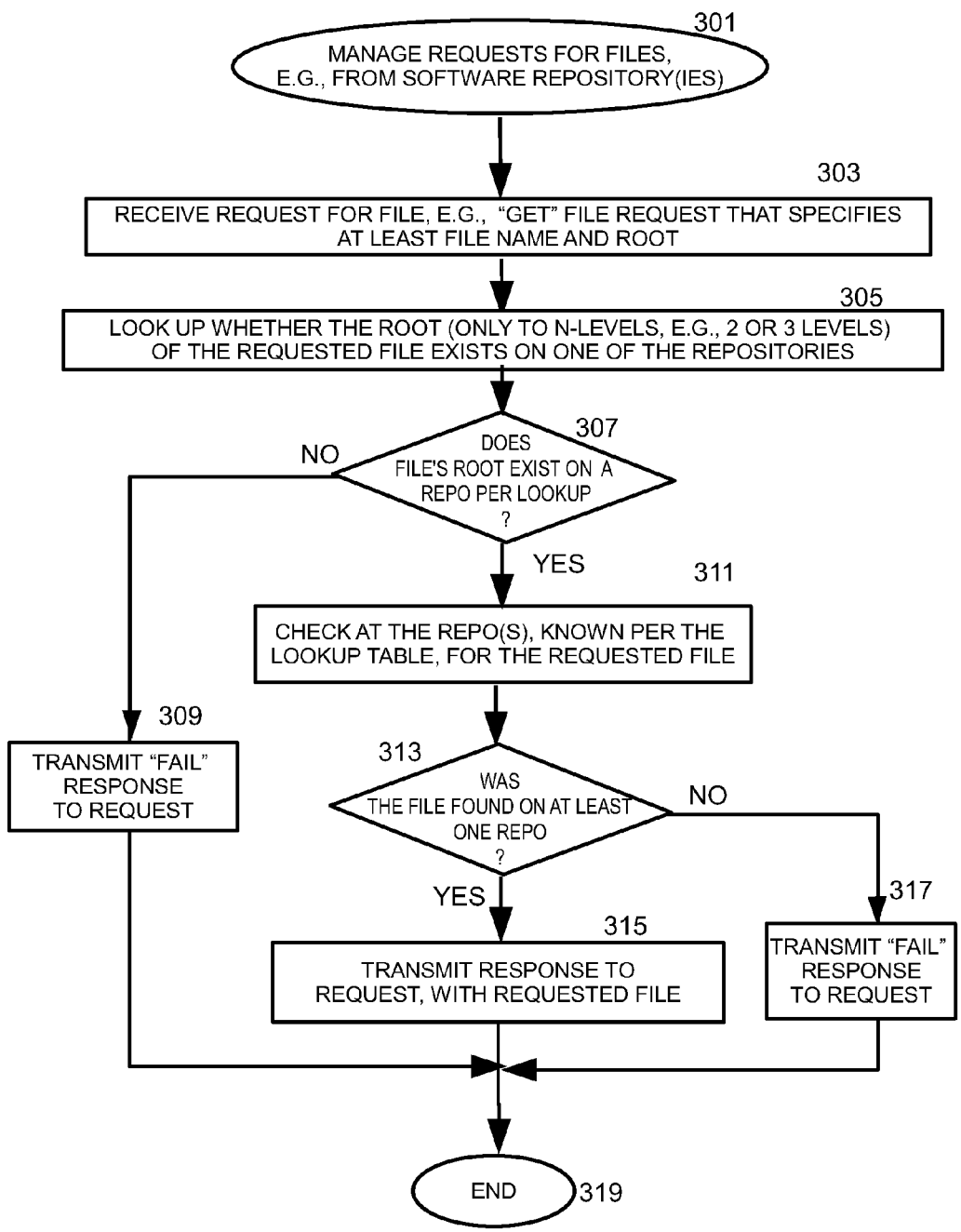
FIG. 3 is a flow chart illustrating a procedure to manage requests for files.
Figure 4:
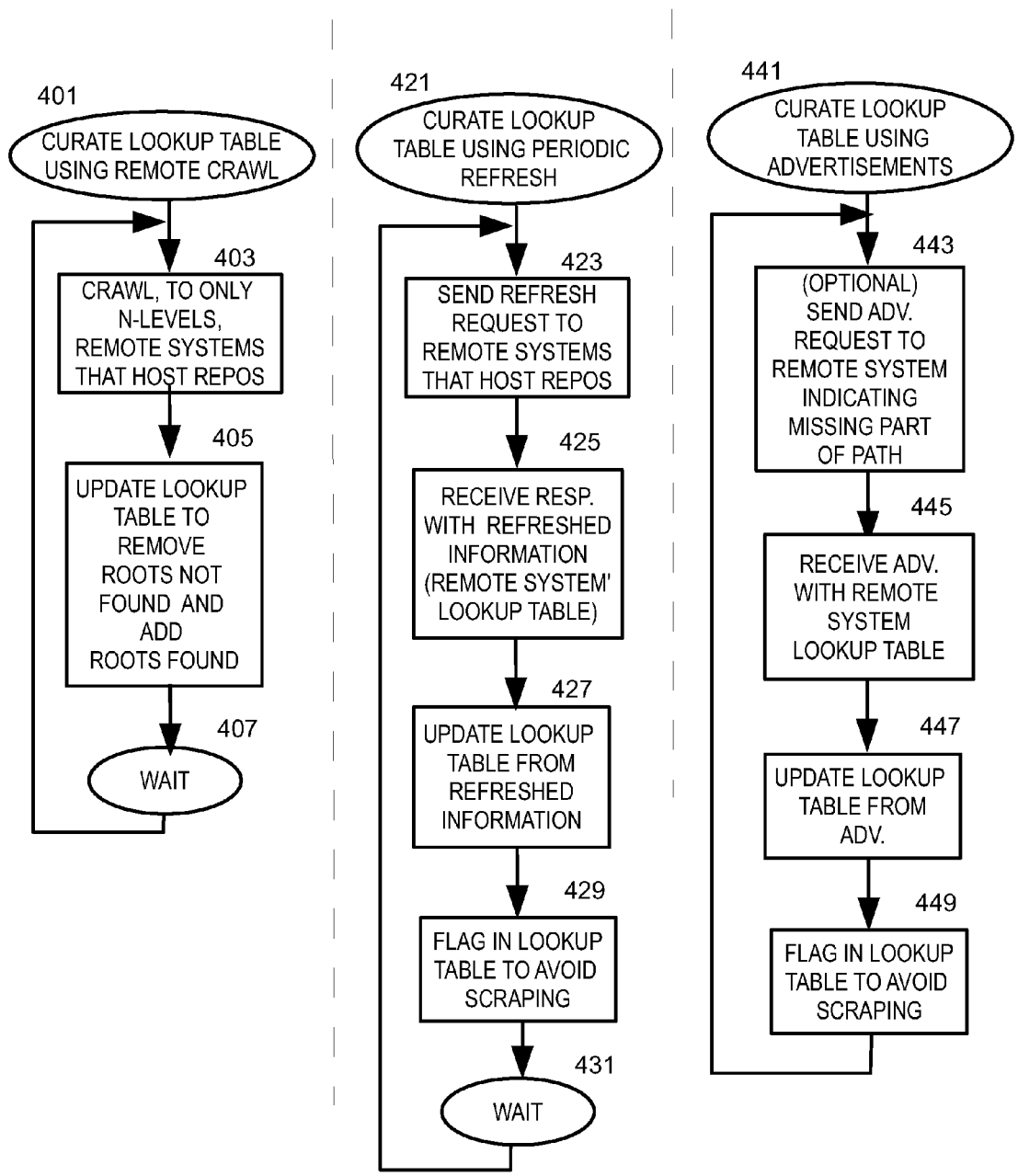
FIG. 4 is a flow chart illustrating procedures to curate a lookup table.

FIG. 3 and FIG. 4 are flow charts that illustrate different procedures related to managing requests for files in relation to software repositories. FIG. 3 relates to handling the request for the file and FIG. 4 relates to curating the lookup table which is referenced by the procedure of FIG. 3. A flow such as in FIG. 3 that handles requests for files is expected to run while file requests may be received. A flow such as in FIG. 4 is expected to be run periodically, for example as a background process, and/or asynchronous to and/or independent of the flow for handling requests for files (e.g., FIG. 3). Any or all of the illustrated procedures can advantageously be implemented on, for example, a processor of a controller, described in connection with FIG. 2 or other apparatus appropriately arranged.

Referring now to FIG. 3, a flow chart illustrating a procedure 301 to manage requests for files, for example files in software repositories, will be discussed and described. In overview, the procedure 301 can receive 303 the request for the file, lookup 305 whether the root of the path for the requested file exists on one (or more) repositories, if 307 the file's root does not exist on a repository per the lookup then transmit 309 a "fail" response to the request, if 307 the file's root does exist on the repository per the lookup then check 311 at the repository for the requested file, and if 313 the file was not found on at least one repository then transmit 317 a "fail" response to the request, and if 313 the file was found on a repository then transmit 315 the requested file in response to the request. Each of these is described in more detail, although some description that is provided elsewhere is not repeated below.

The procedure 301 can receive 303 the request for the file. For example, the request specifies a filename and requests the procedure 301 to transmit a copy of (or link to) the file. A common example is ftp commands GET, RETR and STOU and LIST and other known commands; file transfer protocols are available such as FTP (file transfer protocol, see RFC 959 and related RFCs), AFP (Apple Filing Protocol), BitTorrent, FTAM (file transfer access and management), HFTP (http file transfer protocol), SAFT (simple asynchoronous file transfer), SFTP (SSH file transfer protocol), TFTP (trivial file transfer protocol), Kermit, Lynx, TELINK, XMODEM, variations thereof, and many others which will be known to one of skill in this field. The file name can include the defined path, e.g., "com/reponame/projectname/filename.xxx", or "com/reponame/projectname/artifactID/version/filename.xxx", or similar.

The procedure 301 can lookup 305 whether the root of the path for the requested file exists on one (or more) repositories. The lookup is made only to a predetermined N number of levels, where N is 2 or 3 (that is, 2 levels is the top level domain name plus hostname, 3 levels is top level domain name plus hostname plus project name (or alternatively a subdivision of hostname). Because a repository has a predefined file structure, the N-levels is of the levels defined in the repository coordinate structure. In a repository with a hierarchy defined pursuant to NEXUS, the hierarchy coordinate structure is com/hostname/projectname/artifactID/version/filename.filetype and thus two levels deep is "com/hostname" and three levels deep is "com/hostname/projectname". In the NEXUS hierarchy, the "projectname/artifactID/version" is referred to as GAV (group/artifact/version), as further discussed herein. The term "group" is sometimes used interchangeably with "project", and is a subdivision of the hostname. In this connection, it should be mentioned that the repository on which the requested file may (or may not) exist is structured with a defined repository file structure as is known to those of skill in repositories, discussed elsewhere herein. Because the lookup is made only to predetermined N levels, the lookup entity can be limited to predetermined N levels. Furthermore, the lookup entity can list only existent paths (to N levels) which are known to exist on a particular repository URL. The lookup entity does not need to list the file names known to exist, or more than the predetermined N levels of pathnames. The lookup entity does not need to list file names known to not exist, or parts of or entire pathnames known to not exist. Even if the repository manager manages numerous repositories, the size of the lookup entity can be small and thus stored locally on an efficient and fast memory. A regular website does not have a repository-type hierarchy with a defined coordinate system. The defined coordinate layout on a repository allows this system and procedure discussed herein to exist.

When the file's root does not exist on a repository per the lookup then the procedure 301 transmit 309 a "fail" response to the request. The "fail" response can be any code understood by the relevant request protocol to indicate that the request was unsuccessful. The "fail" is returned without interrogating the repository about the file or for part of the pathname. There is a need to fail fast if the request will fail. Performance speed is necessary, even if occasionally an incorrect "fail" is returned. In operation in the developer community, it is rare that new things two levels down appear—there rarely is a new project, and even more rarely does a user need a file from the new project the first day. As a practical matter, it almost never happens that something is newly published and has an instant audience. Three levels deep is an overall file structure that doesn't change very often (project). Two levels deep is an extra amount of secure-ness that something truly doesn't exist if the system returns a fail. (sonatype.com).

When the file's root (to N-levels, i.e., 2 or 3 levels) does exist on the repository per the lookup, then the procedure 301 can check 311 at the repository for the requested file. Any known technique can be used to check for the requested file. One appropriate technique is an ftp "get" request, which will return a success or fail response, as is known in the art.

Following the success or fail response, when the file was not found on at least one repository as indicated by a fail response from the repository, then the procedure 301 can check request the file from other repositories on which the root is existent. Ultimately, if the file is not found on at least one repository, the procedure 301 can transmit 317 a "fail" in response to the initial request for the file. When the file was found on a repository then the procedure 301 can transmit 315 the requested file in response to the request.

When done processing a request for a file, the process 301 can end 327. The procedure 301 can be initiated when requests for files are received.

Referring now to FIG. 4, a flow chart illustrating procedures to curate a lookup table will be discussed and described. In overview, the procedure can curate the lookup table in one or more ways, here represented by a procedure using remote crawl 401, a procedure using periodic refresh 421, and a procedure using advertisements 441. Each of these is described in more detail, although some description that was provided above is not repeated below. Also, these procedures can be performed in the background.

The procedure using a remote crawl 401 can crawl 403 the remote systems that host the repositories, so as to discover to only N predetermined levels (e.g., N=2 or N=3) which hostnames (for N=2) and which hostnames/projects (for N=3) are hosted on the remote system. In one option, the procedure previously received input indicating the remote systems which it manages. In another option, the procedure is intended to perform the crawl to discovery repositories which will be listed.

The procedure 401 can update 405 the lookup table to remove roots which are no longer existent on a remote system, and can add roots which are found on a remote system. The procedure 401 can wait 407 and repeat, such as on a periodic basis.

The procedure using a periodic refresh 421 can send 423 a refresh request to one or more remote systems that host repositories, and can receive 425 a response with the refreshed information. The information requested is the repository's directory (to at least N-levels, where N=2, or N=3). Conventional commands can be used to communicate the request/response. For example, ftp provides a command to obtain a file directory. The periodic refresh procedure 421 can check the remote systems and/or repositories which are previously stored, and/or can include remote systems/repositories previously input. The procedure 421 can update 427 the lookup table to remove roots which are no longer existent on a remote system, and can add roots which are found on a remote system. Optionally, the procedure 421 can flag the remote system to indicate that it was recently update, so that a parallel crawl/scrape can be avoided on the remote system. The procedure 421 can wait 431 and repeat, such as on a periodic basis.

The procedure using advertisements 441 can (optionally) send 443 an advertisement request regarding one or more remote systems that host repositories. Optionally, the advertisement request can indicate a missing part of a path, or can request the entire path, or can indicate what is present. The procedure 441 can receive 445 the advertisement with the remote system lookup table and/or missing part of the path. Conventional commands can be used to communicate the request for advertisement/advertisement. For example, ftp provides a command to obtain a file directory. The advertisement procedure 441 can send advertisement(s) to the remote systems and/or repositories which are previously stored, and/or can include remote systems/repositories previously input. Also, a remote system from which advertisements were requested can send additional advertisements (without waiting for requests) to advertise changes to its lookup table, which will then be received 445 by the procedure 441. The procedure 441 can update 427 the lookup table to remove roots which are no longer existent on a remote system, and can add roots which are found on a remote system. Optionally, the procedure 441 can flag the remote system to indicate that it was recently update, so that a parallel crawl/scrape can be avoided on the remote system. The procedure 441 can be repeated later, for example periodically after waiting, for example for a pre-determined period of time to expire.

Optionally, the procedure 441 can advertise 443 in response to a request in which it is missing part of the path. For example, if a request is "I need a 1.0 from sonatype.com", the repository manager can advertise "we don't have a 1.0 and we don't have anything from sonatype.com". This can cause the remote repository(ies) to update their look-up tables. There are a number of different ways that the need to update can be conveyed.

The crawling procedure 401, periodic refresh procedure 421, and/or advertising procedure 441 can be performed independent of the request for a file in a repository, and thus, can be performed before the request is received.

Software Repository

Figure 5:
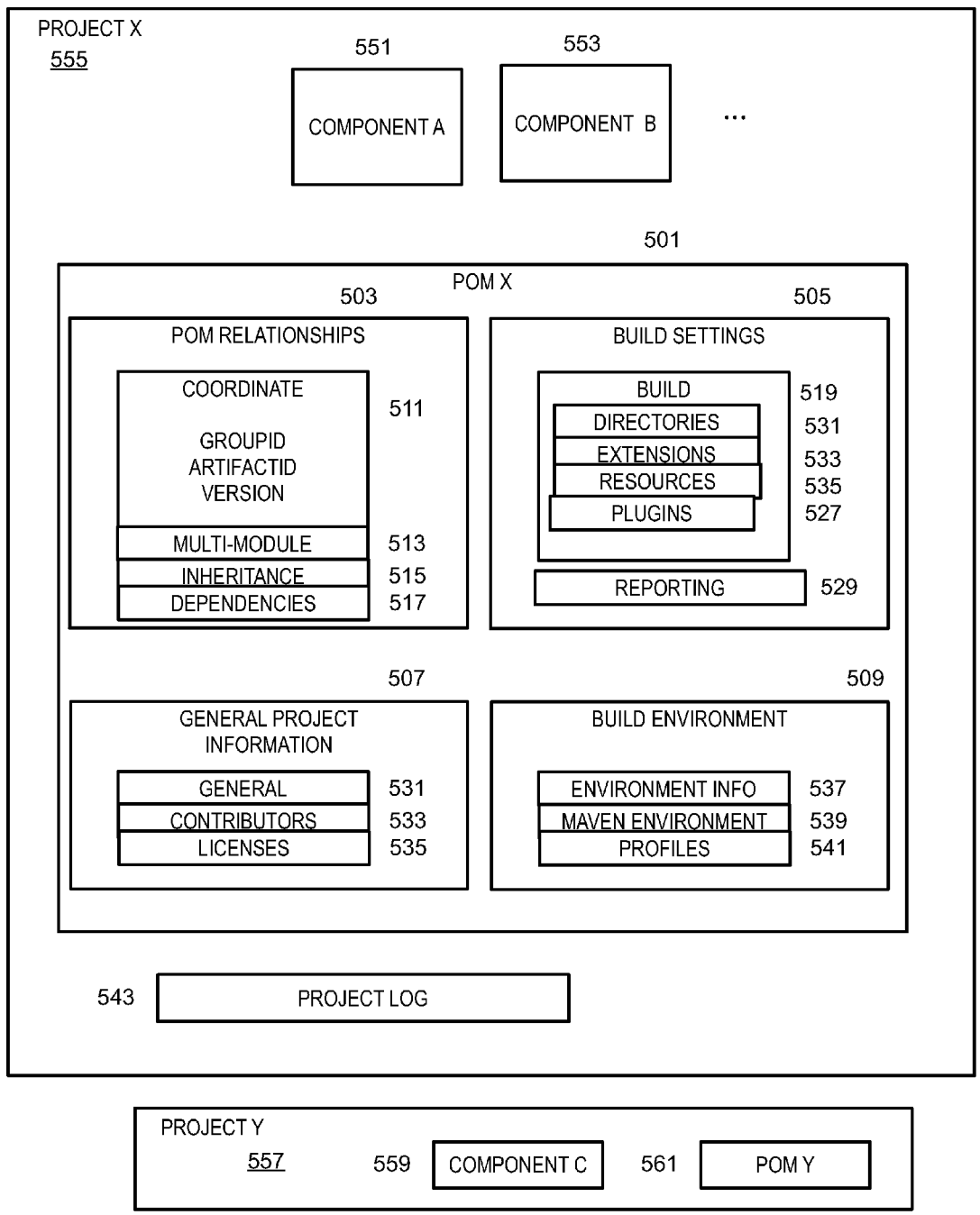
FIG. 5 is a block diagram illustrating a software repository.

Referring now to FIG. 5, a block diagram illustrating a software repository will be discussed and described. FIG. 5 discloses a project object model ("POM"). The project, e.g., project X 555 includes one or more components (here represented by Components A and B 551, 553), the project log 543 for Project X, and metadata for the project X (here represented by POM X 701) that identifies project information such as contributors 533 and licenses 535. The illustrated example is a known Maven software project object model, which provides a highly structured handling of projects and components, sometimes referred to therein as "artifacts". Maven is a build management tool that comprises a project object model ("POM"), a set of standards, a project lifecycle, a dependency management system, and logic for executing plugin goals at defined phases in a lifecycle.

A "Project Object Model" (POM), e.g., POM X 501 is a file provided for a project 555 that describes, configures and customizes an application and is associated with one or more components by being included in the same directory as one or more components. Thus, an artifact (which is in a project) is described by a POM. The POM typically is an XML document. In different build tools or project management tools, the POM 501 is a file included in a project, e.g., project X 555, which includes one or more components (represented by component A and component B 551, 553); the POM can be a file with a pre-determined name: a Maven pom.xml file, a GNU Makefile, or an Ant build.xml file. The POM file is typically targeted to Java applications, building JAR components, C# sources, or the like. A software component can be associated with a POM in alternative ways, for example, by including a link or identification of the associated POM.

The POM 501 can contain description data and configuration data: POM relationships 503, build setting 505, general project information 507, and build environment 509. General project information 507 includes general data 531 (such as project's name, the URL for a project, the sponsoring organization, or the like), a list of developers and contributors 533, and/or the license (or identifiers of licenses) for the project 555.

The build settings 505 for the project 555 can customize the behavior of a build 519 by specifying location of directories 521, extensions 523, resources 525 and plugins 527. Also, the build settings 505 can specify reporting 529 to be used for the POM 501.

The build environment 509 can include settings and profiles that can be activated when the software comprising the components 551 is built for use in different environments. For example, during development the built software is deployed to a development server, whereas in production developers the built software is deployed to a production server. This example provides build environment information 537, Maven environment information 539, and profiles 541 to be used in different builds. Techniques for executing a build of software are known.

The POM relationships 503 include POM coordinates 511 that specify a group ID, an artifact ID, and a version number for the project 555 and for the POM 501. In the conventional Maven system, group ID, artifact ID and version (GAV) uniquely identify each component. The group ID is meant to identify the individual or organization that published the component. The artifact ID uniquely identifies a component for the Group, and in accordance with known techniques indicates what functionality the component is addressed to; artifact IDs need not be unique for different groups. The version is the temporal axis for how a component changes in accordance with known techniques, e.g., Version 1.0 is least mature, and Version 8.2.3 is more mature. Collectively, the group ID, artifact ID and version number are sometimes referred to herein as the "GAV", "Maven coordinate" or "GAV coordinate". The GAV uniquely identifies a component and allows its dependencies and relationship to other components to be tracked. The use of the GAV disambiguates amongst components across various domains of different groups.

The POM as used in Maven is discussed in "MAVEN: The Complete Reference Guide", Edition 8 (2010). In a well-written POM, there is a block for "description," "project", "URL", "License", "Issue tracking", "author list" and the like. Known techniques can be used to construct a POM.

A project, e.g., project X 555 can have a parent, e.g., project Y 557. Project Y 557 is illustrated to include representative component C 559 and a POM Y 561. Values which are not specified in the POM in a child project can inherit values from the POM of a parent project, e.g., when general project information 507 is not specified in the POM X 501 of Project X 555, the project X 555 can inherit the general project information specified in the POM Y 561 of the parent project Y 557.

Also included in a project 555 is a project log 543. The project log 543 can perform known functions, such as recording source code check-in, check-out, update of a component, download of a component from the project, bugs and related fixes, and similar.

A different project, e.g., project Y 557 includes other components (here represented by Component C 559), the project log (not illustrated) for Project Y, and metadata for the project Y (here represented by POM Y 561) that identifies project information such as contributors and licenses.

It is not necessary to use a POM structure according to Maven; alternative implementations of a software repository as a database which includes components, their associated licenses and/or build information and the like will be understood.

For example, in some implementations, a software repository may be very simple, comprising storage of class files, perhaps with an indication whether or not the class is broken and/or an update history.

The detailed descriptions which appear herein may be presented in terms of program procedures executed on a computer or a network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

The Java computer programming language and the Java virtual machine are sometimes mentioned herein, and in this connection reference may be made to a non-exhaustive list of various specifications for Java Language such as JSR 901 The Java Language Specification, Java SE 7 Edition, The Java Language Specification, Third Edition, The Java Language Specification, Second Edition, The Java Virtual Machine Specification, Java SE 7 Edition, The Java Virtual Machine Specification, Second Edition (JVM), JSR 924, and variations and evolutions thereof. In this regard, it can be noted that various computer programming languages can be used to produce byte code that runs on a Java Virtual Machine include, for example, Java, Groovy, Scala, Kotlin, JavaRX Script, JRuby, Jython, Rhino, CLforJava, Flow Java, and/or numerous others.

Terms as used herein are intended to be interpreted as understood to one of skill in the art of software development using Java, virtual machines, and/or software classes, instead of as interpreted by a more general dictionary.

Also, a "pathname", sometimes referred to as "path" is generally known, and is intended to point to a unique location in a file system by following a directory tree hierarchy expressed as a string of characters in which path components, which are typically separated by a delimiting character, represent a directory within the directory tree hierarchy; the designation "full path" or "absolute path" can be used to indicate a pathname that is unique within the file system and is expressed in relation to a root directory; the designation "relative path" can be used to indicate a pathname that is relative to a working directory and thus does not need the full path; the designation "root directory" indicates the first or top-most directory in a hierarchy; the content and syntax of the pathname can depend on conventions such as Microsoft Windows Universal Naming Convention (UNC), POSIX pathname definition which provides a Unix-like syntax, MS-DOS Windows-style system API, and others. In a repository, an entire "file name" (or full "filename") uniquely identifies a computer file and typically includes a "root" name or UID plus extension (e.g., sonatype.com or "com/sonatype"), a "project" name, and the short "file name" with the name and file type (e.g., xyz.jar); optionally an entire "file name" in a repository can include none, one or more of: project name, artifact identifier, and/or version identifier.

Furthermore, the networks of interest for communicating between computers onto which some embodiments may be distributed include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), NetBIOS (Network Basic Input Output System), GPRS (general packet radio service), I-mode and other wireless application protocols, and/or other protocol structures, and variants and evolutions thereof such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system that manages requests for files, comprising:

a look-up table storage configured to store a look-up table having information on roots that are stored on repositories managed by a repository manager, the information on the roots in the look-up table being only n-levels deep, wherein n-levels is a same predetermined number of levels;

a memory; and a processor cooperatively operable with the look-up table storage and the memory, and configured to, based on instructions stored in the memory:

before checking repositories managed by the repository manager for the requested file, determines by reference, limited to the root of the requested file or only part of the root of the requested file, to the look-up table whether the root of the requested file exists on one of the repositories managed by the repository manager;

bypasses a check of the one of the repositories when the look-up table does not indicate that the root exists on the repository;

checks the repository for the requested file, when the root is indicated as existing on the repository;

returns the requested file, if found on at least one of the repositories; and returns a "fail" response to the request for the file, if the root of the requested file is not indicated as existing in the look-up table.

2. The computer system of claim 1, wherein the n-levels is two or three levels.

3. The computer system of claim 1, wherein the processor is further configured to build the look-up table by crawling remote systems that host the repositories to only n-levels, and store the look-up table that is built, in the look-up table storage.

4. The computer system of claim 1, wherein the processor is further configured to build the look-up table by receiving an advertisement from a remote system that hosts the one of the repositories, the advertisement indicating the remote system lookup table to the repository manager.

5. The computer system of claim 1, wherein the processor is further configured to build the look-up table at two or three levels deep only.

6. The computer system of claim 1, wherein the processor is further configured to periodically refresh the look-up table, by at least one of sending a request to a remote system that hosts one of the repositories, for a refresh of the look-up table of the remote system, and re-crawling folders at the remote system that hosts one of the repositories to only n-levels to re-confirm content in the look-up table.

7. The computer system of claim 1, wherein the processor is further configured to send, to a remote system that hosts one of the repositories, a request for an advertisement, the advertisement indicating to the repository what part of the path the repository manager does not have, so that the repository manager can be updated; and build the look-up table by receiving the advertisement from the remote system that hosts the one of the repositories, the advertisement indicating the remote system lookup table to the repository manager.

8. A computer-implemented method, comprising:

receiving, at a repository manager, a request for a file, the request including a file name and a file path with a root;

before checking repositories managed by the repository manager for the requested file, determining, at the repository manager, by reference, limited to the root of the requested file or, only part of the root of the requested file, to a look-up table whether the root of the requested file exists on one of the repositories managed by the repository manager, information on the roots in the look-up table being only n-levels deep, wherein n-levels is a same predetermined number of levels;

bypassing, at the repository manager, a check of the one of the repositories when the look-up table does not indicate that the root exists on the repository;

checking, at the repository manager, the repository for the requested file, when the root is indicated as existing on the repository;

returning, in the repository manager, the requested file if found on at least one of the repositories; and returning, in the repository manager, a "fail" response to the request for the file, if the root of the requested file is not indicated as existing in the look-up table.

9. The computer implemented method of claim 8, wherein the n-levels is two or three levels.

10. The computer-implemented method of claim 8, further comprising building, at the repository manager, the look-up table by crawling remote systems that host the repositories to only n-levels, and storing the look-up table that is built.

11. The computer-implemented method of claim 8, further comprising building, at the repository manager, the look-up table by receiving an advertisement from a remote system that hosts the one of the repositories, the advertisement indicating the remote system lookup table to the repository manager.

12. The computer-implemented method of claim 8, further comprising building the look-up table at two or three levels deep only.

13. The computer-implemented method of claim 8, further comprising periodically refreshing the look-up table, by at least one of sending, from the repository manager, a request to a remote system that hosts one of the repositories, for a refresh of the look-up table of the remote system, and re-crawling, in the repository manager, folders at the remote system that hosts one of the repositories to only n-levels to re-confirm content in the look-up table.

14. The computer-implemented method of claim 8, further comprising sending, from the repository manager to a remote system that hosts one of the repositories, a request for an advertisement, the advertisement indicating to the repository what part of the path the repository manager does not have, so that the repository manager can be updated; and building, at the repository manager, the look-up table by receiving the advertisement from the remote system that hosts the one of the repositories, the advertisement indicating the remote system lookup table to the repository manager.

15. A non-transitory computer-readable medium comprising instructions for execution by a computer, the instructions including a computer-implemented method to manage requests for files, the instructions for implementing:

storing, in a look-up table storage, a look-up table having information on roots that are stored on repositories managed by a repository manager, the information on the roots in the look-up table being only n-levels deep, wherein n-levels is a same predetermined number of levels;

receiving a request for a file, the request including a file name and a file path with a root;

before checking repositories managed by the repository manager for the requested file, determining by reference, limited to the root of the requested file or only part of the root of the requested file, to the look-up table whether the root of the requested file exists on one of the repositories managed by the repository manager;

bypassing a check of the one of the repositories when the look-up table does not indicate that the root exists on the repository;

checking the repository for the requested file, when the root is indicated as existing on the repository;

returning the requested file, if found on at least one of the repositories; and returning a "fail" response to the request for the file, if the root of the requested file is not indicated as existing in the look-up table.

16. The non-transitory computer-readable medium of claim 15, wherein the n-levels is two or three levels.

17. The non-transitory computer-readable medium of claim 15, further comprising
building the look-up table by crawling remote systems that host the repositories to only n-levels, and
storing the look-up table that is built, in the look-up table storage.

18. The non-transitory computer-readable medium of claim 15, further comprising
building the look-up table by receiving an advertisement from a remote system that hosts the one of the repositories, the advertisement indicating the remote system lookup table to the repository manager.

19. The non-transitory computer-readable medium of claim 15, further comprising
building the look-up table at two or three levels deep only.

20. The non-transitory computer-readable medium of claim 15, further comprising
periodically refreshing the look-up table, by at least one of
sending a request to a remote system that hosts one of the repositories, for a refresh of the look-up table of the remote system, or
re-crawling folders at the remote system that hosts one of the repositories to only n-levels to re-confirm content in the look-up table.

21. The non-transitory computer-readable medium of claim 15, further comprising
sending, to a remote system that hosts one of the repositories, a request for an advertisement, the advertisement indicating to the repository what part of the path the repository manager does not have, so that the repository manager can be updated; and
building the look-up table by receiving the advertisement from the remote system that hosts the one of the repositories, the advertisement indicating the remote system lookup table to the repository manager.

* * * * *